US009702979B1

(12) United States Patent
Joseph et al.

(10) Patent No.: US 9,702,979 B1
(45) Date of Patent: Jul. 11, 2017

(54) UNIVERSAL CHANNEL FOR LOCATION TRACKING SYSTEM

(75) Inventors: Angelo J. Joseph, Melbourne, FL (US); Sami R. Wahab, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1182 days.

(21) Appl. No.: 13/565,870

(22) Filed: Aug. 3, 2012

(51) Int. Cl.
| | |
|---|---|
| *G01S 19/21* | (2010.01) |
| *G01S 19/24* | (2010.01) |
| *G01S 19/25* | (2010.01) |
| *G01S 19/28* | (2010.01) |
| *G01S 19/29* | (2010.01) |
| *G01S 19/31* | (2010.01) |
| *G01S 19/32* | (2010.01) |
| *G01S 19/33* | (2010.01) |

(52) U.S. Cl.
CPC ............. *G01S 19/24* (2013.01); *G01S 19/21* (2013.01); *G01S 19/256* (2013.01); *G01S 19/28* (2013.01); *G01S 19/29* (2013.01); *G01S 19/31* (2013.01); *G01S 19/32* (2013.01); *G01S 19/33* (2013.01)

(58) Field of Classification Search
CPC .............. G01S 19/21; G01S 19/24; G01S 19/28–19/33; G01S 19/37; G01S 19/256; G01S 19/30; G06F 9/30043
See application file for complete search history.

(56) References Cited

U.S. PATENT DOCUMENTS

| | | | | |
|---|---|---|---|---|
| 6,591,019 B1* | 7/2003 | Comair | ............... | G06F 9/30043 345/419 |
| 6,639,541 B1* | 10/2003 | Quintana | ............... | G01S 19/21 342/18 |
| 6,650,288 B1* | 11/2003 | Pitt | ............... | G01S 19/05 342/357.42 |

(Continued)

OTHER PUBLICATIONS

De Wilde et al., A First-of-a-Kind Galileo Receiver Breadboard to Demonstrate Galileo Tracking Algorithms and Performances, Proceedings of the 17th International Technical Meeting of the Satellite Division of the Institute of Navigation, ION GNSS 2004, p. 2645-2654, 2004.*

(Continued)

*Primary Examiner* — Bernarr Gregory
*Assistant Examiner* — Fred H Mull
(74) *Attorney, Agent, or Firm* — Angel N. Gerdzhikov; Donna P. Suchy; Daniel M. Barbieri

(57) ABSTRACT

The disclosure is directed to a universal tracking system configured for tracking a plurality of supported sources and/or signal types. The universal tracking system may include an acquisition module configured to execute a serial or parallel search to detect visible signals. The universal tracking system may include at least one universal channel capable of extracting tracking data from a plurality of supported signal types. The universal channel may include complex correlators configured to correlate digital samples associated with one or more ranging signals utilizing primary, sub-carrier, and/or secondary codes. The universal (Continued)

channel may be configured to determine tracking data associated with at least one ranging signal of the plurality of supported signal types. The universal tracking system may further include a navigation processor configured to determine location utilizing tracking data received from one or more universal channels.

9 Claims, 5 Drawing Sheets

(56) References Cited

U.S. PATENT DOCUMENTS

| | | | | |
|---|---|---|---|---|
| 6,738,015 | B1* | 5/2004 | Linhart | G01S 19/30 |
| | | | | 342/357.31 |
| 6,784,831 | B1* | 8/2004 | Wang | G01S 19/21 |
| | | | | 342/357.63 |
| 8,384,592 | B1* | 2/2013 | Crary | G01S 19/24 |
| | | | | 342/357.63 |
| 2005/0162307 | A1* | 7/2005 | Kato | G01S 19/32 |
| | | | | 342/357.62 |
| 2007/0183486 | A1* | 8/2007 | Cheng | G01S 19/25 |
| | | | | 375/150 |
| 2007/0274374 | A1* | 11/2007 | Abraham | G01S 19/30 |
| | | | | 375/148 |
| 2012/0059578 | A1* | 3/2012 | Venkatraman | G01C 21/20 |
| | | | | 701/411 |
| 2012/0169538 | A1* | 7/2012 | Singh | G01S 19/30 |
| | | | | 342/357.69 |
| 2012/0169542 | A1* | 7/2012 | Mathews | G01S 19/256 |
| | | | | 342/450 |

OTHER PUBLICATIONS

B.W. Parkinson et al., Global Positioning System: Theory and Applications, vol. 1; Progress in Astronautics and Aeronautics, vol. 163, American Institute of Aeronautics and Astronautics, Inc., p. 10-11, 1996.*

* cited by examiner

UNIVERSAL CHANNEL FOR LOCATION TRACKING SYSTEM

TECHNICAL FIELD

The present disclosure relates to the field of location tracking systems, and in particular to a system and method for providing a universal channel capable of handling multiple signal types for a location tracking system.

BACKGROUND

Location tracking systems are employed in a variety of commercial and noncommercial contexts. For example, GNSS receivers are commonly implemented in avionic or automotive navigation systems to determine location of a moving or stationary aircraft or vehicle. A location tracking system commonly functions by determining a location relative to one or more passive or active signal sources, such as satellites, cell phone towers, Wi-Fi routers, Bluetooth beacons, IR emitters, LEDs, reflectors, and the like.

Typically, a location tracking system is capable of detecting a source or constellation of sources emitting or reflecting a common signal type. However, many modern location tracking systems can take advantage of multiple signal types by utilizing multiple channels configured to each handle a specified signal type and frequency band. For example, a multiple-channel location tracking system may include 40 channels, wherein channels 1-20 are configured to handle GPS L1 C/A signals and channels 21-40 are configured to handle Galileo E1.

It may be especially desirable to provide location tracking systems capable of processing multiple signal types in many applications where certain signal types may have superior visibility at certain times. For example, GNSS receivers employed on aircrafts may have an improved ability to capture signals of a certain signal type from one or more sources (e.g. GPS L1) at a certain time and an improved ability to capture signals of a different signal type from one or more sources (e.g. Galileo E1) at a different time. Therefore, a GNSS receiver capable of detecting multiple signal types may improve accuracy of the determined location at any given time.

The current multiple-channel approaches for implementing multiple-constellation, multiple-frequency receivers are limited by the need to include fixed channels for each signal type. Accordingly, the current multiple-channel location tracking systems do not offer flexibility to freely allocate channels to signal types in a manner that may enhance location tracking capabilities and increase system efficiency. Including more channels to track multiple signal types also tends to require additional time and/or processing power for monitoring the additional channels to extract tracking data that can be utilized to determine a location.

Therefore, it is desirable to provide location tracking systems capable of tracking multiple signal types without the foregoing limitations.

SUMMARY

The present disclosure is directed to system and method for providing a universal channel for a location tracking system.

In one aspect, the present disclosure is directed to a universal channel for determining tracking data associated with at least one ranging signal of a plurality of supported signal types, including: a carrier generator configured to receive digital samples of at least one ranging signal of a plurality of supported signal types, the carrier generator further configured to downconvert one or more signals associated with the received digital samples; at least one correlator of a plurality of correlators configured to receive the one or more downconverted signals, the at least one correlator further configured to correlate the one or more downcoverted signals with code generator outputs; and a tracking module configured to determine tracking data associated with the at least one ranging signal utilizing information associated with the correlated signals.

In another aspect, the present disclosure is directed to a universal tracking system for determining location utilizing tracking data associated with at least one ranging signal of a plurality of supported signal types, including: a front-end receiver configured to receive ranging signals from a plurality of sources, the front-end receiver further configured to convert ranging signals into digital samples; an acquisition module configured to acquire digital samples of at least one ranging signal, the acquisition module further configured to detect signal visibility of the at least one received ranging signal; a plurality of universal channels, each channel including: a carrier generator configured to receive digital samples of at least one ranging signal of a plurality of supported signal types, the carrier generator further configured to downconvert one or more signals associated with the received digital samples; at least one correlator of a plurality of correlators configured to receive the one or more downconverted signals, the at least one correlator further configured to correlate the one or more downcoverted signals with code generator outputs; and a tracking module configured to determine tracking data associated with the at least one ranging signal utilizing information associated with the correlated signals; and a tracking module configured to determine tracking data associated with the at least one ranging signal utilizing information associated with the correlated signals; and a navigation processor configured to determine a location utilizing tracking data collected from each of the plurality of universal channels.

In another aspect, the present disclosure is directed to a method of determining location utilizing tracking data associated with at least one ranging signal of a plurality of supported signal types, including the steps of: receiving ranging signals of a plurality of supported signal types from a plurality of sources; converting ranging signals into digital samples; detecting signal visibility of at least one ranging signal of a plurality of supported signal types; receiving digital samples of the at least one ranging signal having a desired signal visibility; downconverting the digital samples of the at least one ranging signal to create one or more downconverted signals; correlating the one or more downconverted signals utilizing at least one of primary or secondary codes; determining tracking data associated with the at least one ranging signal utilizing information associated with the correlated signals; and determining a location utilizing tracking data associated with the at least one ranging signal.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

FIGS. 1A through 3 generally illustrate a system and method for providing a universal channel for a location tracking system. In general, location tracking systems may include one or more channels configured to track signals from one or more sources. Each channel may include hardware, software, and/or firmware configured to extract tracking data, such as code phase and/or carrier phase, from a ranging signal. The tracking data may be associated with relative location and movement of a location tracking system compared to a tracked source providing or reflecting the ranging signal. A location tracking system may further include multiple channels configured to track multiple sources. The multiple channels may be further configured to track specified signal types. However, including fixed channels configured for tracking specified signal types may not adequately meet performance needs of certain situations where system flexibility is desired. Accordingly, a location tracking system may benefit from employing universal channels configured to support a plurality of signal types so that any channel can be configured to track any signal of the plurality of supported signal types. For example, a universal channel may track signals from one or more different sources or signals from one or more different frequency bands having superior visibility at any given time.

Figure 1A:
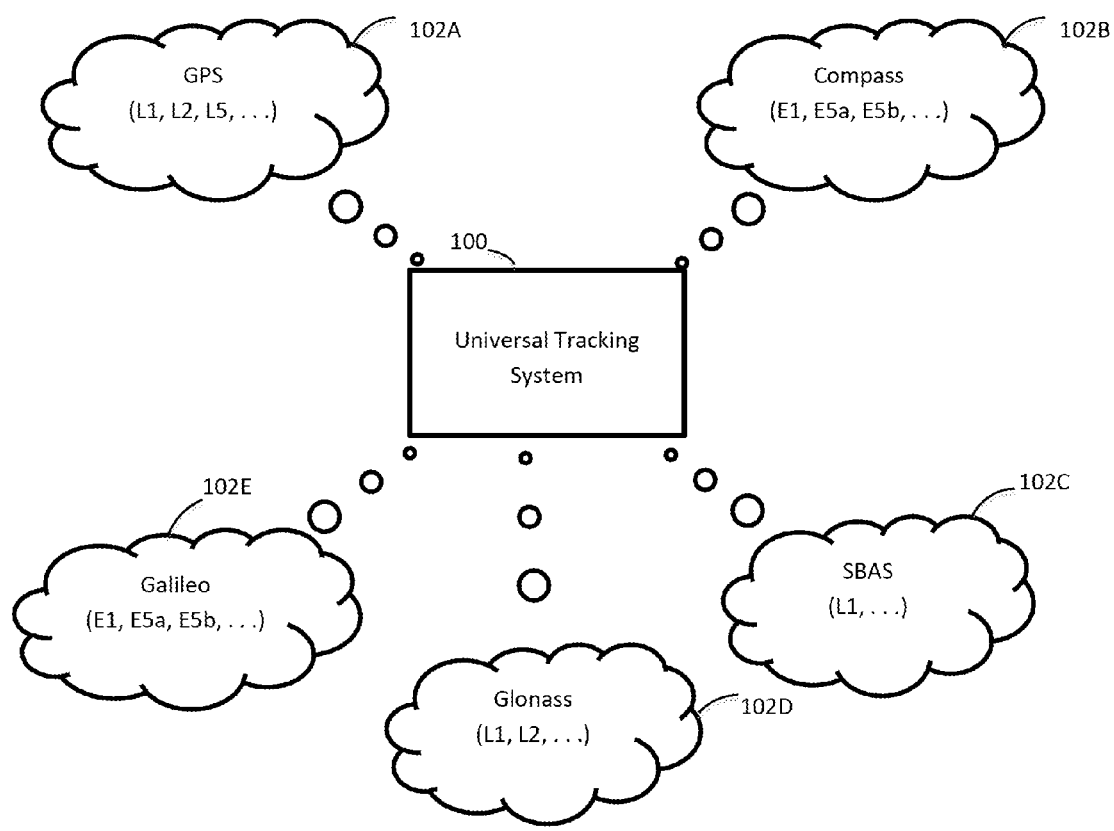
FIG. 1A is a block diagram illustrating a universal tracking system for determining location utilizing signals from one or more sources emitting a plurality of supported signal types, in accordance with one embodiment of the present disclosure.
Figure 1B:
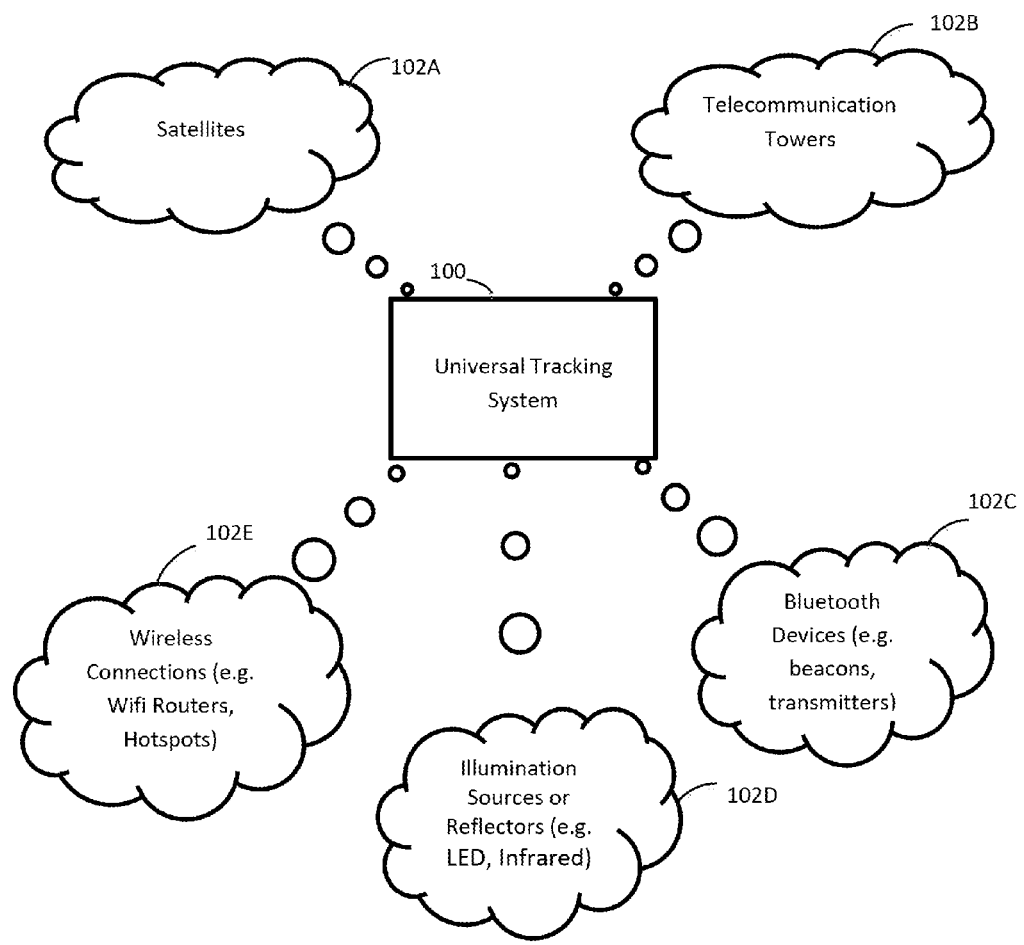
FIG. 1B is a block diagram illustrating a universal tracking system for determining location utilizing signals from one or more sources emitting a plurality of supported signal types, wherein the one or more sources may include a plurality of supported source types, in accordance with one embodiment of the present disclosure.
Figure 1C:
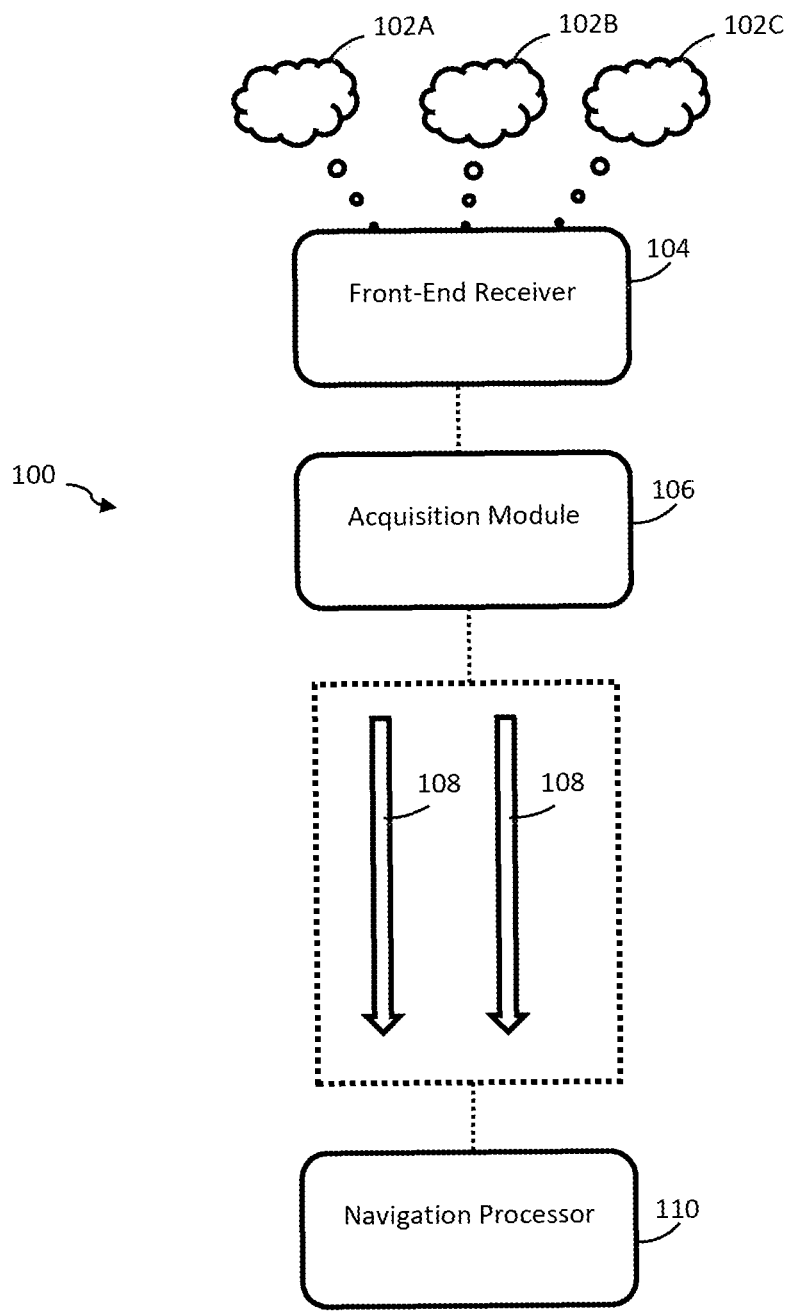
FIG. 1C is a block diagram illustrating a universal tracking system for determining location utilizing signals from one or more sources emitting a plurality of supported signal types, in accordance with one embodiment of the present disclosure.

FIGS. 1A through 1C illustrate a universal tracking system 100 configured to determine a location based on one or more signals received from one or more sources 102. For example, the universal tracking system 100 may be configured to track signals of a plurality of supported signal types, such as GPS L1, GPS L5, SBAS L1, Galileo E1, Galileo E5a, Galileo E5b, Glonass L1, Compass L1, Compass E5a, Compass E5b, and the like. The universal tracking system 100 may be further configured to detect and track interference signals, such as continuous wave (CW) interference signals. It is further contemplated that the universal tracking system 100 may be configured to track signals from one or more sources 102 of a plurality of supported source types, such as satellites (e.g. GPS, SBAS, Galileo, Glonass, Compass), telecommunication towers, Wi-Fi routers, Hotspots, Bluetooth beacons, LEDs, IR emitters, and the like.

In one embodiment, the universal tracking system 100 may be configured to detect one or more constellations including a plurality of sources 102. For example, the universal tracking system 100 may be configured to detect signals from a constellation including two or more sources 102 of the same source type. In a further embodiment, the universal tracking system 100 may be configured to detect signals from a first constellation including two or more sources 102 of a first source type and additional signals from at least one additional constellation including two or more sources 102 of at least one additional source type. It is noted herein that any description of the universal tracking system 100 with regards to tracking one or more signals of a plurality of supported signal types shall apply regardless of whether or not the universal tracking system 100 is configured to detect constellations. In some embodiments, however, the universal tracking system 100 may determine location with improved accuracy by tracking signals from one or more constellations because the redundancy achieved by tracking signals from one or more sources 102 of the same source type in a constellation may reduce error associated with tracking data extracted from the ranging signals.

As shown in FIG. 1C, the universal tracking system 100 may include a front-end receiver 104 configured to detect a plurality of different signal types (i.e. "supported signal types"). The front-end receiver 104 may include at least one antenna configured to receive signals from one or more sources 102. In one embodiment, the front-end receiver 104 may include at least one steerable antenna configured to actuate to a desired position and/or orientation to improve visibility of signals from one or more sources 102. Alternatively, the front-end receiver 104 may include optional detectors in place of or in addition to an RF antenna, such as photo-detectors, sonar detectors, IR detectors, and the like. Implementing a plurality of detector types may expand the scope of supported signal types and/or supported sources 102. Furthermore, it is contemplated that a first detector may be included to support a first plurality of signal types and an additional detector may be included to support a second plurality of signal types. Accordingly, the description herein should not be limited to RF signal types and should be understood to extend to any signal type suitable for determining location.

The front-end receiver 104 may further include a front-end control module configured to convert ranging signals into digital samples. Any use of the term "module" herein is intended to include any software, hardware, and/or firmware embodiment configured to execute one or more specified algorithms. For example, the front-end control module may include a single or multiple computing systems including one or more processors configured to execute program instructions from carrier media and/or discrete components, such as logical gates. The one or more hardware, software, or firmware elements of the front-end control module may be configured to carry out all or part of an analog-to-digital conversion algorithm to convert the ranging signals into digital samples. Any other module described herein may similarly include one or more processors configured to execute program instructions from carrier media and/or discrete components configured to execute one or more predetermined algorithms.

In one embodiment, the front-end control module may be further configured to perform a pre-processing algorithm on the digital samples to convert complex digital samples into real digital samples. The front-end control module may be configured to translate complex in-phase and quadrature digital samples into a lower frequency rate, such as the sampling frequency (Fs) divided by four (Fs/4). The front-end control module may be further configured to convert the lower frequency digital samples into real digital samples to reduce complexity of subsequent tracking data and location determination.

The universal tracking system 100 may further include at least one acquisition module 106 in communication with the front-end receiver 104. The acquisition module 106 may be configured to determine signal visibility associated with ranging signals. The acquisition module 106 may be configured to perform non-coherent or differential integrations to determine signal visibility. The acquisition module 106 may be configured to perform a desired number of integrations. For example, the acquisition module 106 may be configured to execute a specified maximum number of integrations. Alternatively, the acquisition module 106 may be configured to perform integrations until a desired signal visibility is detected. In one embodiment, the acquisition module 106 may include at least one multi-trial detector to detect at least one statistic (e.g. SNR ratio) associated with signal visibility of the ranging signal.

In one embodiment, the acquisition module 106 may be configured to execute a serial search of a plurality of frequency bins to determine signal visibility values associated with the ranging signal. The acquisition module 106 may be configured to sum correlations at half-chip code phase shifts. The acquisition module 106 may be further configured to compare information associated with the summed correlations against a threshold value. The acquisition module 106 may be further configured to determine to detect at least one peak value associated with signal visibility of the ranging signal.

In one embodiment, the acquisition module 106 may be configured to execute a parallel search of the plurality of frequency bins to determine signal visibility values associated with the ranging signal. The acquisition module 106 may be configured to sum correlations at half-chip code phase shifts. The acquisition module 106 may be further configured to execute a fast Fourier transform (FFT) at the end of each summation to detect signal visibility.

In one embodiment, the acquisition module 106 may be configured to execute a parallel search of a plurality of code bins to determine signal visibility. The acquisition module 106 may be configured to execute a FFT on the incoming digital samples rotated down to the baseband frequency for each of the plurality of frequency bins. The acquisition module 106 may be further configured to determine the conjugate of the FFT of multiple code sequences. The acquisition module 106 may be further configured to execute a FFT on the corresponding pseudo random noise (PRN) replica code. The acquisition module 106 may be further configured to execute an inverse FFT to detect signal visibility.

In one embodiment, the acquisition module 106 may be configured to execute a hybrid search to determine signal visibility values of the ranging signal. The acquisition module 106 may be configured to execute a serial search for the code correlations and may be further configured to execute a parallel search of the frequency bins.

In one embodiment, the acquisition module 106 may be further configured to be synchronized with collection of the digital samples. For example, the digital samples may be collected at a desired sample rate set by an internal clock, such as a 1 ms timer. Accordingly, the acquisition module 106 may be configured to determine a starting code phase with respect the desired sample rate synchronized by the internal clock.

In one embodiment, the acquisition module 106 may be further configured to store bit-packed versions of pre-computed frequency carrier tables. The acquisition module 106 may be configured to store the frequency carrier tables offline for access at any desired time. The acquisition module 106 may be further configured to execute a signal processing algorithm to convert ranging signals into digital samples at a desired baseband frequency. For example, the acquisition module 106 may be configured to mix bit-packed samples utilizing multi-byte exclusive-OR (XOR) operations. In one embodiment, the acquisition module 106 may be further configured to down-convert a ranging signal at a high frequency, such as a frequency in the GHz range, to a baseband frequency acceptable for processing, such as a frequency in the MHz range.

The universal tracking system 100 may further include one or more channels 108 in communication with the acquisition module 106. The channels 108 may be configured to receive digital samples associated with one or more ranging signals of the plurality of supported signal types from the front-end receiver 104. The channels 108 may be further configured to receive digital samples associated with one or more desired ranging signals emanating from the one or more sources 102. For example, a channel 108 may be configured to receive one or more ranging signals of the plurality of supported signal types having a desired signal type and/or frequency band. The desired signal type and/or frequency band may be manually specified or, alternatively, the desired signal type and/or frequency band may be automatically selected. For example, the desired signal type and/or frequency band may correspond to a detected source 102 having an improved visibility. The channels 108 may be further configured to extract tracking data associated with the ranging signal from the digital samples.

The universal tracking system 100 may further include a navigation processor 110 configured to acquire tracking data from the channels 108. The navigation processor 110 may include hardware, software, and/or firmware, such as one or more computing systems including at least one processor configured to execute program instructions from carrier media. The navigation processor 110 may be configured to determine location utilizing tracking data acquired from the channels 108. For example, the navigation processor may be configured to execute one or more algorithms known to the art to determine pseudo ranges, carrier phase measurements, satellite positions, receiver position, receiver velocity, receiver time, RAIM/FDE, lateral and/or vertical deviations from the desired flight path, and the like.

In one embodiment, the one or more channels 108 may include one or more universal channels 200 configured to support a plurality of supported signal types and/or frequency bands. Including universal channels 200 may allow support for a plurality of signal types with as little as one channel 108. Therefore, a universal tracking system 102 including universal channels 200 may provide advantageous performance and/or efficiency enhancements by allowing desired channel allocation for desired signal detection in certain situations.

Figure 2:
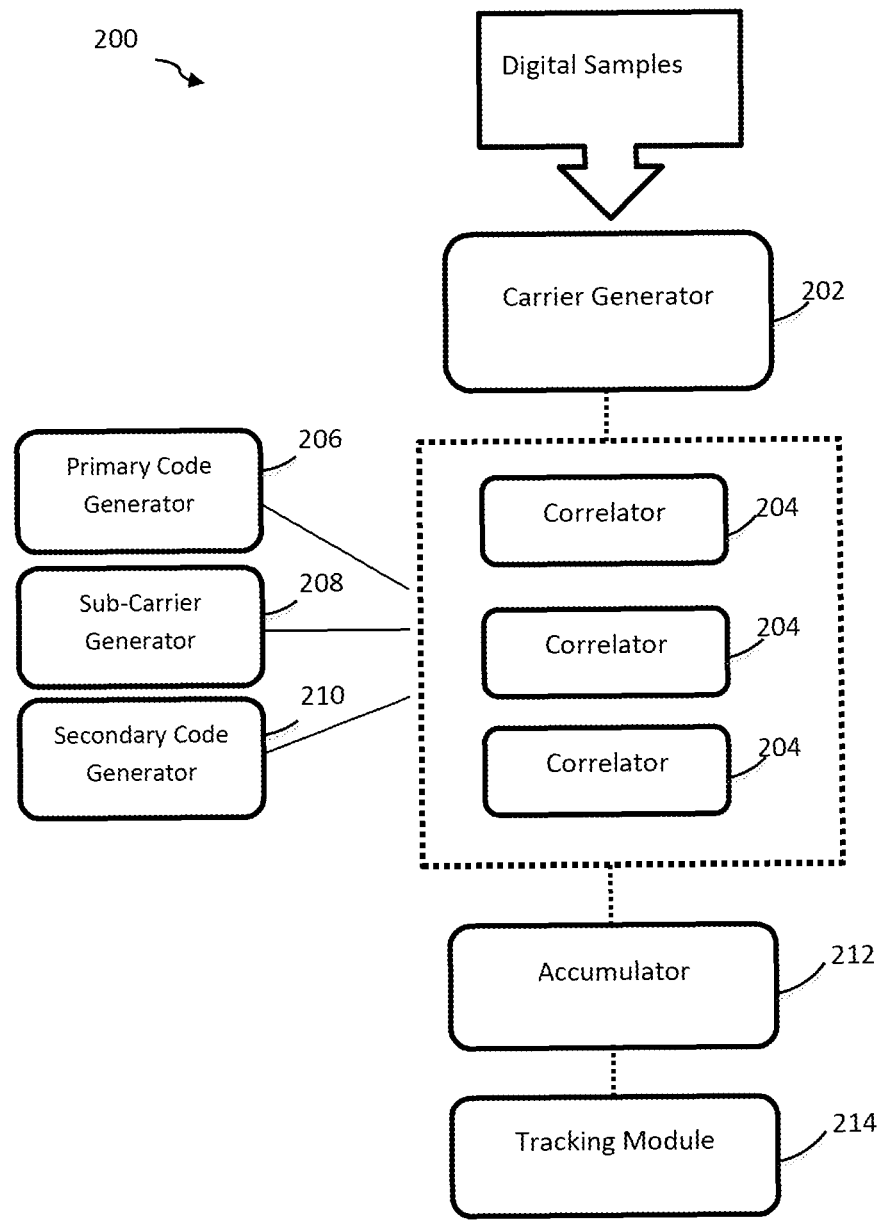
FIG. 2 is a block diagram illustrating a universal channel for determining tracking data associated with one or more signals of a plurality of supported signal types, in accordance with one embodiment of the present disclosure.

FIG. 2 illustrates a universal channel 200 configured to determine tracking data associated with one or more ranging signals of a plurality of supported signal types from one or more sources 102. A channel control module in communication with the universal channel 200 may be configured to assign the universal channel 200 to track one or more desired sources 102 based on an initial search by the front-end receiver 104 and/or acquisition module 106 to detect visible sources 102 in range. The channel control module may be further configured to assign the universal channel 200 to a source having superior visibility or to a manually designated source.

In one embodiment, the channel control module may be further configured to assign one or more sets of universal channels 200 to track sources 102 of a constellation. The channel control module may be further configured to assign sets of universal channels 200 to receive digital samples associated with ranging signals of a common signal type(s) emanating from tracked sources 102 of a constellation. The channel control module may be further configured to assign one or more universal channels 200 of a set to receive digital samples associated with ranging signals having a Doppler frequency associated with a desired source 102 of a constellation. In one embodiment, a first set of universal channels 200 may be assigned to track signals from a first constellation of desired sources 102, and at least one additional set of universal channels 200 may be assigned to track signals from at least one additional constellation of desired sources 102.

The foregoing examples are included for illustrative purposes only to demonstrate flexibility attained by inclusion of one or more universal channels 200. The universal channel 200 described herein should be understood to have capabilities to track any supported signal or source type and may, therefore, be assigned to receive digital samples associated with any desired signal and/or source included in the supported plurality of sources.

The universal channel 200 may be configured to acquire code phase and carrier frequency of the ranging signal. The universal channel 200 may be further configured to execute code and/or carrier pull-in algorithms to transition to tracking. The universal channel 200 may be further configured to execute a BIT synchronization algorithm. The universal channel 200 may be further configured to determine tracking data, such as code phase and carrier phase of a ranging signal.

The universal channel 200 may include a carrier generator 202, such as a numerically controlled oscillator (NCO), in communication with the front-end receiver 104 and/or acquisition module 106 of the universal tracking system 100. The carrier generator 202 may be configured to receive digital samples associated with one or more ranging signals from the front-end receiver 104 and/or acquisition module 106. The ranging signals may have unique Doppler frequencies associated with a source 102 assigned to the universal channel 200. Accordingly, the universal channel 200 may be assigned to receive digital samples associated with ranging signals of a desired signal type having a desired frequency associated with a desired source 102. The carrier generator 202 may be further configured to generate one or more local carrier signals associated with the received digital samples. The carrier generator 202 may generate the local signal at a desired frequency to downconvert the received digital samples for code phase and carrier phase tracking.

The universal channel 200 may further include one or more complex correlators 204 in communication with the carrier generator 202. The correlators 204 may be configured to receive the local signal and/or a phase shifted (e.g. 90 degree phase shifted) local signal from the carrier generator 202. The correlators 204 may be further configured to correlate the local signal utilizing primary codes from at least one primary code generator 206. In one embodiment, the correlators 204 may be further configured to correlate the local signal utilizing sub-carrier codes from at least one sub-carrier generator 208. In one embodiment, the correlators 204 may be further configured to correlate the local signal utilizing secondary codes from at least one secondary code generator 210.

In one embodiment, the universal channel 200 may further include one or more delay blocks disposed between the correlators 204 and the primary code generator 206, sub-carrier generator 208, and/or secondary code generator 210. The delay block may be configured to delay the codes being transmitted to the correlators 204 so that code replicas are output the correlators 204 at desired chip spacings.

In one embodiment, the universal channel 200 may include at least six complex correlators 204. However, it is contemplated that the universal channel 200 may include any number of correlators 204 necessary to support the plurality of desired signal and/or source types. For example, the universal channel 200 may include a number of correlators 204 necessary to support double-delta type discriminators and/or correlation function monitors within the universal channel 200.

In one embodiment, the universal channel 200 may further include one or more correlators 204 to track data and data-less components of certain signal types having data and data-less components, such as GPS L5, Galileo E1, Galileo E5a, Galileo E5b, and the like. For example, at least one correlator 204 may be configured to track the carrier phase of the data-less component, and one or more additional correlators may be configured to track code phase and/or configured for correlation function monitoring. The universal channel 200 may be configured to assign each correlator 204 to one of at least two primary codes. The universal channel 200 may be configured to assign each correlator 204 to one of at least two secondary codes.

In one embodiment, the universal channel 200 may be further configured to track interference sources, such as CW interferences. The universal channel 200 may be configured to track interference sources to determine tracking data and/or enhance location determination. For example, the universal channel 200 may be configured to track interference sources to mitigate their effects on location determination of the universal tracking system 100.

In one embodiment, the universal channel 200 may be configured to disable unnecessary code generators 206, 208, or 210 for some ranging signal types. For example, the sub-carrier generator 208 and secondary code generator 210 may be disabled for certain signal types, such as GPS L1 C/A signals.

The universal channel 200 may further include at least one accumulator 212 in communication with the correlators 204. The accumulator 212 may be configured to sum correlations to determine a deviation between the one or more generated local signals and the corresponding ranging signals. In one embodiment, the accumulator 212 output may be fed into a tracking loop (e.g. phase-locked loop) to adjust subsequent measurements and/or processing in the universal channel 200.

The universal channel 200 may further include a tracking module 214 configured to acquire information associated with the ranging signal from the accumulator 212. The tracking module 214 may be configured to determine tracking data utilizing information associated with the ranging signal from the accumulator 212. For example, the tracking module 214 may be configured to determine code and carrier phase of the ranging signal utilizing a peak detected by the accumulator 212.

In one embodiment, the tracking module 214 may be further configured to determine tracking data associated with the ranging signal utilizing tracking data associated with at least one additional ranging signal. For example, the tracking module 214 of the universal channel 200 may utilize tracking data acquired from a different channel to aid determination of tracking data for the ranging signal. In one embodiment, ranging signals of a same or different supported signal type may be utilized to aid tracking data determination of one another. In one embodiment, ranging signals of a same or different satellite type may be utilized to aid tracking data determination of one another.

Figure 3:
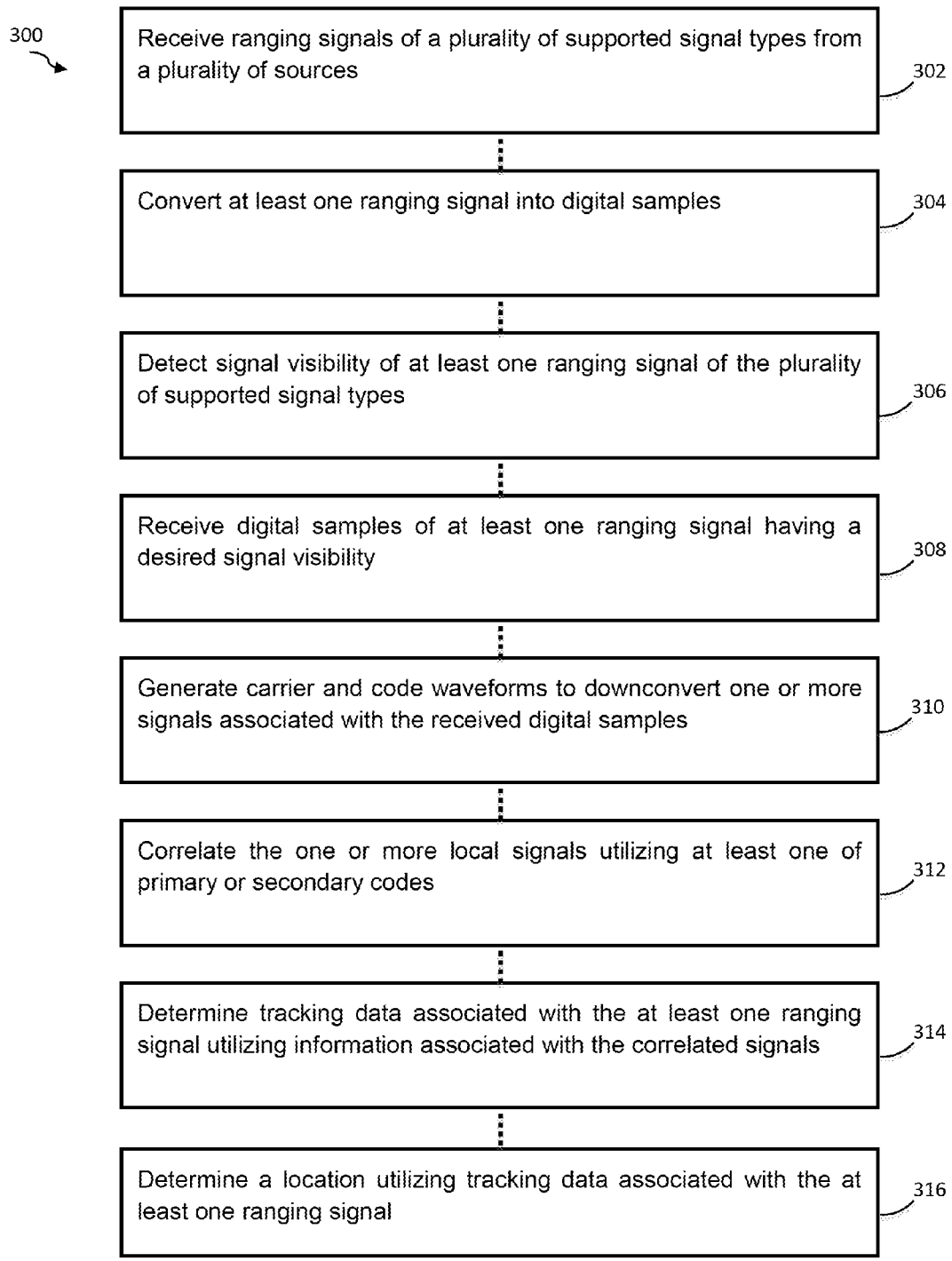
FIG. 3 is a flow diagram illustrating a method of determining a location utilizing one or more signals of a plurality of supported signal types, in accordance with one embodiment of the present disclosure.

FIG. 3 is a flow diagram illustrating a method 300 of determining a location utilizing one or more signals of a plurality of supported signal types. The universal tracking system 100 and the universal channel 200 are exemplary vehicles for carrying out method 300. However, the method 300 is not necessarily limited to the foregoing embodiments and should extend to any acceptable systems or devices now or hereafter known to the skilled in the art. Furthermore, the foregoing elements of the universal tracking system 100 and the universal channel 200 may be configured to carry out various steps of method 300 not specifically mentioned above or in an order other than the order described above without departing from the essence of the present disclosure.

In step 302, the method 300 may receive ranging signals of the plurality of supported signal types from one or more sources 102. In step 304, the method 300 may convert ranging signals into digital samples at a baseband frequency for signal processing to determine tracking data. In step 306, the method may execute a serial or parallel acquisition search detect signal visibility of at least one ranging signal. The method may detect signal visibility associated with digital samples of at least one ranging signal utilizing non-coherent integrations or utilizing a single or multi-trial detector to determine at least one detection statistic, such as a signal-to-noise ratio (SNR). In step 308, the method 300 may acquire digital samples of at least one of the ranging signals having a desired signal visibility. In one embodiment, the acquired digital samples may correspond to ranging signals assigned to a channel 108, 200 of the universal tracking system 100. The ranging signal assigned to the channel 108, 200 may have a desired signal visibility and/or may correspond to a desired signal type, frequency, and/or source. In step 310, the method 300 may generate local signals associated with the acquired digital samples for correlation. For example, the method 300 may generate carrier and/or code waveforms to downconvert signals associated with the digital samples. In step 312, the method 300 may correlate the generated local signals utilizing primary, sub-carrier, and/or secondary codes. In step 314, the method 300 may determine tracking data information associated with the correlations to extract attributes, such as code phase and/or carrier phase, of the ranging signal. In step 316, the method 300 may determine location utilizing tracking data associated with one or more ranging signals. For example, the location may be determined utilizing tracking data associated with a plurality of ranging signals tracked through a plurality of channels.

It should be recognized that the various steps described throughout the present disclosure may be carried out by a single computing system or, alternatively, a multiple computing system. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for determining location by utilizing tracking data associated with at least three ranging signals of a plurality of supported signal types, comprising:
    a front-end receiver configured to receive ranging signals from a plurality of sources, the front-end receiver further configured to convert the ranging signals into digital samples;
    an acquisition module implemented as hardware configured to acquire digital samples of at least three ranging signals of the ranging signals received by the front-end receiver, the acquisition module further configured to detect signal visibility of the at least three ranging signals, the acquisition module comprising at least one processor, wherein the acquisition module is further configured to utilize stored bit-packed sample versions of pre-computed frequency carrier data, wherein the acquisition module is further configured to convert each of the at least three ranging signals into digital samples at a desired baseband frequency by mixing associated bit-packed sample versions by utilizing multi-byte exclusive-OR operations;
    a plurality of universal channels, each channel including:
        carrier generator hardware configured to receive digital samples of a particular ranging signal of the at least three ranging signals of a plurality of supported signal types, the carrier generator further configured to downconvert one or more signals associated with the received digital samples, the carrier generator hardware comprising an oscillator;
        at least one correlator of a plurality of correlators configured to receive the one or more downconverted signals, the at least one correlator further configured to correlate the one or more downcoverted signals with code generator outputs; and
        a tracking module comprising a processor, the tracking module configured to determine tracking data associated with the particular ranging signal of the at least three ranging signals by utilizing information associated with the correlated signals; and
    a navigation processor configured to determine a location by utilizing tracking data collected from each of the plurality of universal channels.

2. The system of claim 1, wherein the plurality of supported signal types includes different types of satellite signals.

3. The system of claim 2, wherein the plurality of supported signal types includes signals from at least one of GPS, GBAS, SBAS, Galileo, Glonass, Compass satellites.

4. The system of claim 2, wherein the plurality of supported signal types includes at least two of GPS L1 C/A, GPS L5, SBAS L1 C/A, Galileo E1, Galileo E5a, Galileo E5b, Glonass L1, Compass L1, Compass E5a, or Compass E5b signals.

5. The system of claim 2, wherein a first channel of the plurality of universal channels is configured to aid determination of tracking data associated with a first ranging signal by utilizing tracking data associated with a second ranging signal.

6. The system of claim 5, wherein the first ranging signal and the second ranging signal are each associated with a different signal type.

7. The system of claim 6, wherein the first ranging signal and the second ranging signal are associated with a same satellite type.

8. The system of claim 5, wherein a second channel of the plurality of universal channels is configured to provide tracking data associated with the second ranging signal to the first channel.

9. The system of claim 1, wherein the acquisition module is further configured to execute a hybrid search to determine signal visibility values for each of the at least three ranging signals, the hybrid search including a serial search of code correlations and parallel search of frequency bins.

\* \* \* \* \*